United States Patent
Lutz et al.

(10) Patent No.: US 7,083,186 B2
(45) Date of Patent: Aug. 1, 2006

(54) AIRBAG MODULE

(75) Inventors: Joachim Lutz, Schechingen (DE); Robert Mohr, Weinstadt (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 50 days.

(21) Appl. No.: 10/122,610

(22) Filed: Apr. 12, 2002

(65) Prior Publication Data

US 2002/0149183 A1    Oct. 17, 2002

(30) Foreign Application Priority Data

Apr. 17, 2001    (DE) ............................ 201 06 599 U

(51) Int. Cl.
*B60R 21/205*    (2006.01)

(52) U.S. Cl. ..................... 280/728.3; 280/732

(58) Field of Classification Search ............. 280/730.2, 280/731, 732, 728.3
See application file for complete search history.

(56) References Cited

U.S. PATENT DOCUMENTS

| | | | |
|---|---|---|---|
| 4,332,398 A | 6/1982 | Smith | |
| 5,087,067 A | 2/1992 | Seki et al. | |
| 5,342,083 A * | 8/1994 | Gentile et al. | 280/728.2 |
| 5,452,913 A * | 9/1995 | Hansen et al. | 280/728.1 |
| 5,460,403 A | 10/1995 | Hansen et al. | |
| 5,676,393 A * | 10/1997 | Rose | 280/728.3 |
| 5,873,598 A | 2/1999 | Yoshioka et al. | 280/740 |
| 5,884,939 A * | 3/1999 | Yamaji et al. | 280/743.1 |
| 5,988,677 A | 11/1999 | Adomeit et al. | 280/740 |
| 6,024,377 A * | 2/2000 | Lane, Jr. | 280/728.3 |
| 6,029,996 A | 2/2000 | Yoshioka et al. | |
| 6,171,228 B1 | 1/2001 | Marotzke et al. | |
| 6,460,878 B1 | 10/2002 | Eckert et al. | |
| 2002/0130492 A1* | 9/2002 | Webber et al. | 280/728.2 |

FOREIGN PATENT DOCUMENTS

| | | |
|---|---|---|
| DE | 29516426 | 1/1996 |
| DE | 19535565 | 3/1997 |
| DE | 19860933 | 7/2000 |
| DE | 19904072 | 8/2000 |
| DE | 19958152 | 6/2001 |
| JP | 2303952 | 12/1990 |
| JP | 05286403 A * | 11/1993 |
| JP | 10218484 | 8/1998 |

\* cited by examiner

*Primary Examiner*—Paul N. Dickson
*Assistant Examiner*—Laura B. Rosenberg
(74) *Attorney, Agent, or Firm*—Tarolli, Sundheim, Covell & Tummino LLP

(57) ABSTRACT

An airbag module for a vehicle occupant restraint system comprises a housing and an airbag which is folded up into an airbag pack. The airbag is arranged in the housing and is adapted to be inflated by gas from a pressurized gas source. The housing has an outlet opening that defines an outlet plane and has a predetermined width that is smaller than the largest width of the airbag pack, measured parallel to the outlet plane.

1 Claim, 3 Drawing Sheets

AIRBAG MODULE

TECHNICAL FIELD

The invention relates to an airbag module for a vehicle occupant restraint system.

BACKGROUND OF THE INVENTION

Conventional airbag modules comprise a housing and an airbag which is folded up into an airbag pack, the airbag being arranged in the housing and adapted to be inflated by means of gas from a pressurized gas source, the housing having an outlet opening that defines an outlet plane. Such airbag modules are generally cuboidal in shape. On the passenger side, they are preferably installed in the dashboard, as is shown, for example, in German Pat. No. 197 36 243 A1, namely, with their lengthwise axis crosswise to the driving direction. Until now, the airbag modules have been provided with the largest possible outlet opening for the airbag; the width of the outlet opening, that is to say, the dimension crosswise to the lengthwise axis in the outlet plane, is usually approximately as large as the largest width of the module housing in the same direction, so that the airbag pack can be ejected rapidly and without hindrance. Such a large outlet opening, however, also requires a correspondingly large cover flap in the dashboard. In order to keep the effect to the vehicle occupants to a minimum if they are not seated in the optimal sitting position, however, the installation site for the airbag module should be as far away from the vehicle occupant as possible, in other words, near the windshield.

Therefore, the object of the invention is to provide an airbag module that can be installed near the windshield.

BRIEF SUMMARY OF THE INVENTION

According to the invention, an airbag module for a vehicle occupant restraint system comprises a housing and an airbag which is folded up into an airbag pack. The airbag is arranged in the housing and is adapted to be inflated by means of gas from a pressurized gas source. The housing has an outlet opening that defines an outlet plane and has a predetermined width that is smaller than the largest width of the airbag pack, measured parallel to the outlet plane. As a result, the cover flap in the dashboard can likewise be smaller and consequently can weigh less. This makes it possible to install the airbag module closer to the windshield and thus further away from the vehicle occupant.

Additional advantageous embodiments of the invention will be apparent from the subordinate claims.

DETAILED DESCRIPTION OF THE PREFERRED EMBODIMENT

Figure 1:
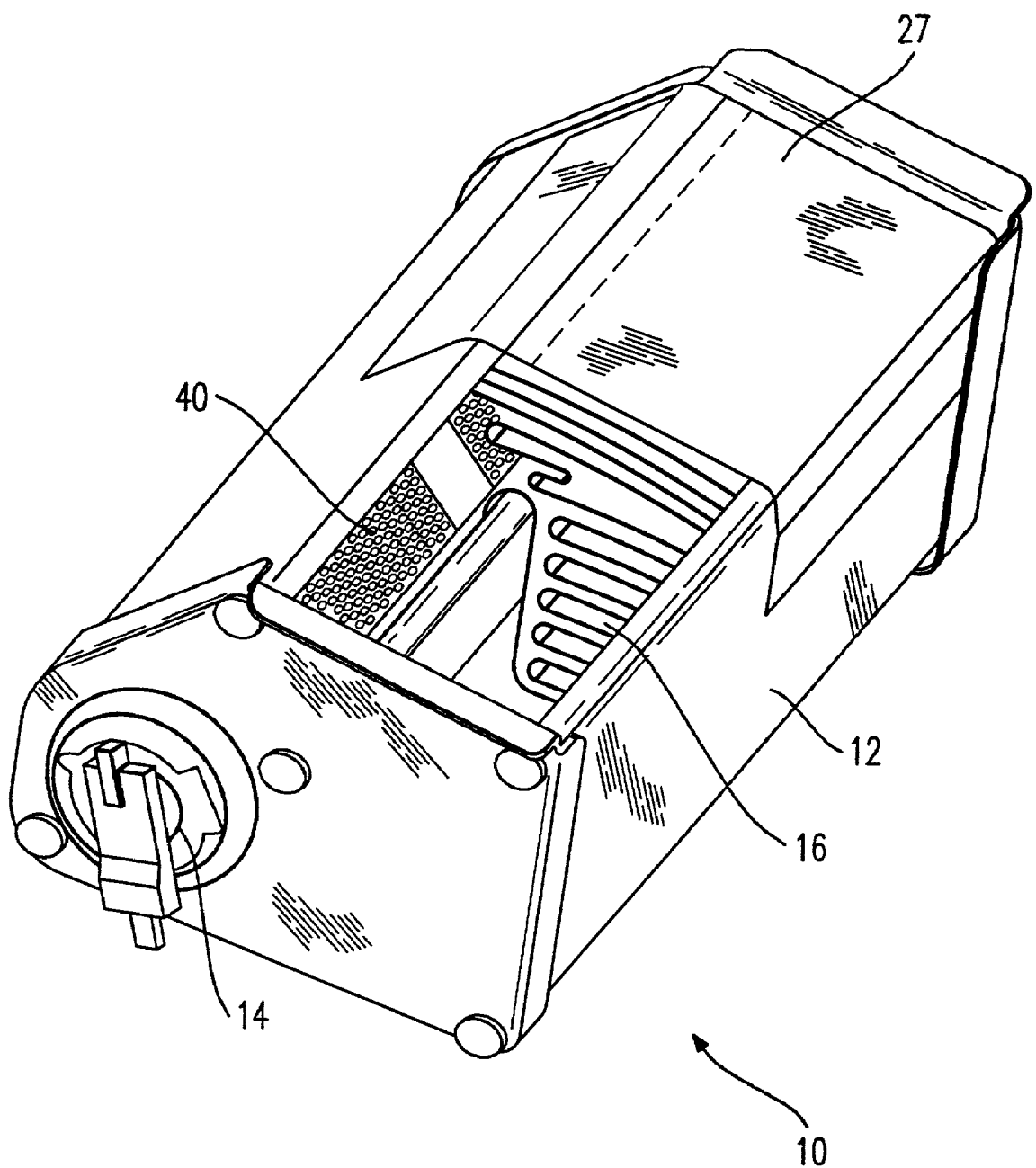
FIG. 1 is a perspective view of an airbag module according to the invention.
Figure 2:
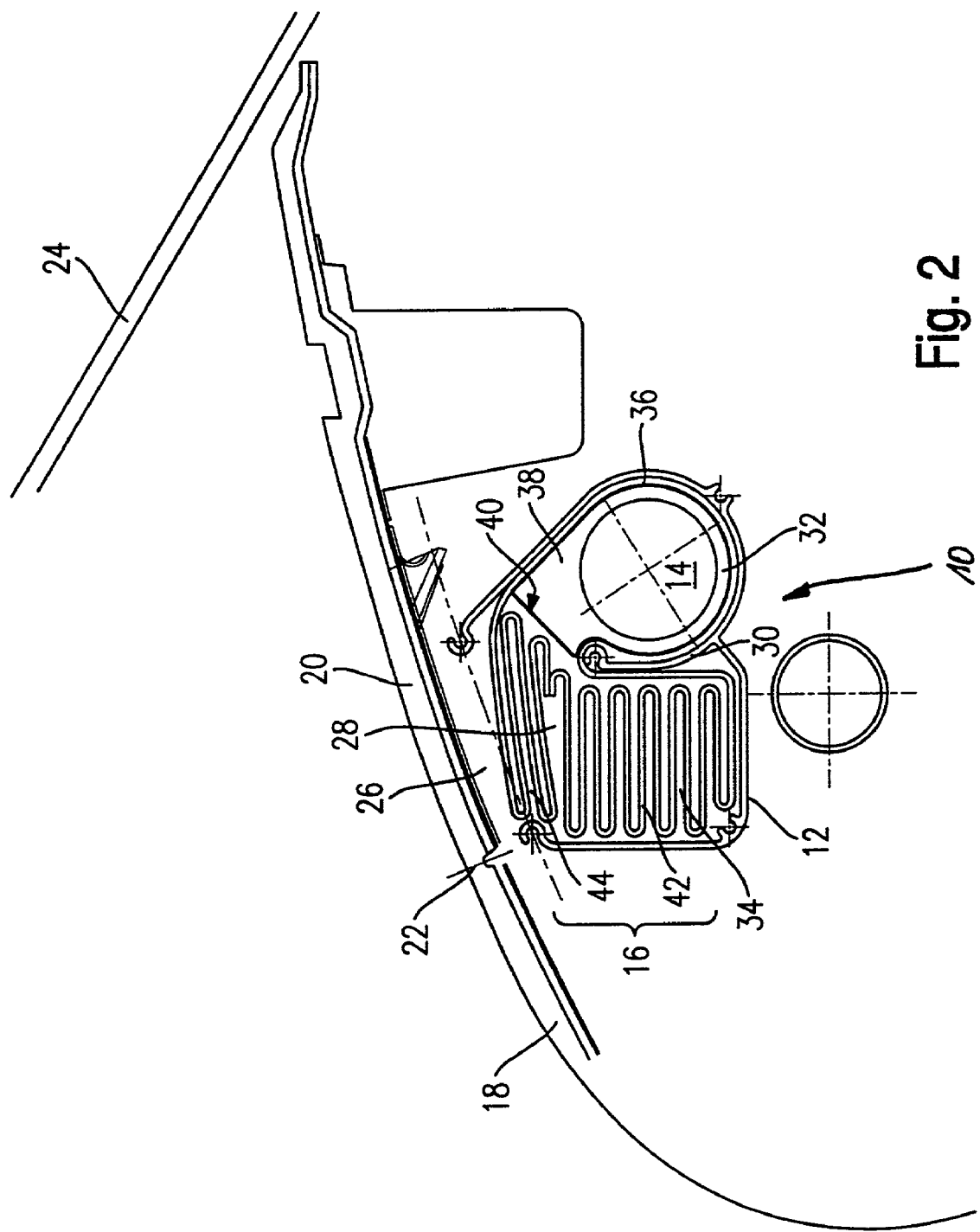
FIG. 2 shows a cross-section through the airbag module of FIG. 1 in the non-deployed state.
Figure 3:
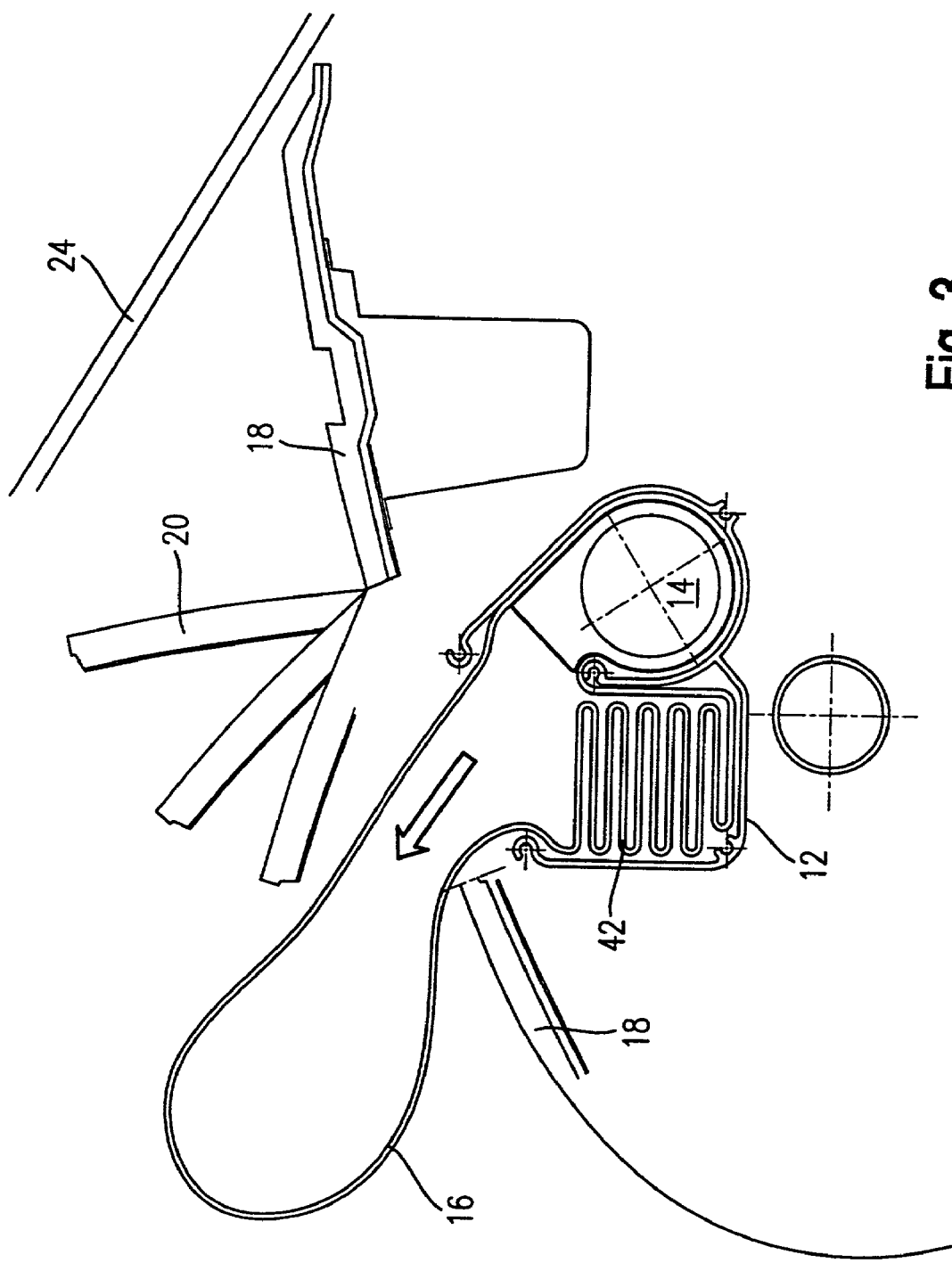
FIG. 3 shows a cross-section through the airbag module of FIG. 1 in the deployed state.

The airbag module 10 in FIG. 1 through 3 has a housing 12 containing a tubular gas generator 14 and a folded airbag 16. In FIGS. 2 and 3, it can be seen that the airbag module 10 is installed in a dashboard 18 of a vehicle, namely, on the passenger side. The dashboard 18 is provided with a cover flap 20 that covers the housing 12. On the edge facing the vehicle occupant, the cover flap 20 is connected via a predetermined breaking line 22 to the dashboard 18, so that it can be swung open towards the windshield 24.

The housing 12 is preferably made of an extruded aluminum section and, on its side adjacent to the dashboard 18, has an outlet opening 26 for the airbag 16, which defines an outlet plane. The width of the housing 12 tapers towards the outlet opening 26 so that, in the vicinity of the outlet opening 26, the side walls of the housing 12 form a funnel-like ejection channel 28 through which the airbag 16 can be ejected from the housing 12. The housing 12 is separated by a dividing wall 30 into a generator chamber 32 and an airbag chamber 34, both of which open up into the ejection channel 28. The outlet opening 26 is closed off by a perforated protective sleeve 27 in order to protect the inside of the airbag module 10 from dirt and damage.

In the generator chamber 32, there is arranged the gas generator 14 that serves as the source of pressurized gas used to unfold the airbag 16. The gas generator 14 is completely surrounded radially by a diffuser plate 36. The diffuser plate 36 has an outlet channel 38 pointing to the airbag 16, which projects into the ejection channel 28 and which can feed the gas generated by the gas generator to the airbag 16. The wall of the outlet channel 38 adjacent to the airbag 16 is provided with outlet openings 40 for the pressurized gas generated by the gas generator 14.

The airbag 16 is folded up into an airbag pack, which consists of a lower stack 42 and an upper stack 44. The lower stack 42 comprises about two-thirds of the airbag 16 and is folded in zigzag shape in the airbag chamber 34, while the upper stack 44 contains the remaining one-third of the airbag 16, likewise folded in zigzag shape, and is situated in the ejection channel 28 directly in front of the outlet opening 26. As can be seen in FIG. 2, the width of the outlet opening 26 is smaller than the maximum width of the upper stack 44, namely, measured in a plane that is parallel to the outlet plane. However, it has been found that the reduced width of the outlet opening 26 does not significantly hinder the unfolding of the airbag.

Naturally, it is conceivable to have a different division of the airbag pack, perhaps with other folding techniques, which could also vary for the individual stacks.

The airbag 16 encompasses the diffuser plate 36 in the generator chamber 32, by means of which the airbag 16 is at the same time attached in the airbag module 10.

In case of deployment (FIG. 3), the gas generator 14 is activated so that the pressurized gas it generates is fed through the outlet channel 38 into the ejection channel. Due to the pressure of the gas, the upper stack 44 is pushed out of the ejection channel, thereby tearing open the cover flap 20 at the predetermined breaking line 22, so that the cover flap frees the outlet opening 26. Then the airbag 16 can exit from the housing 12 in the outlet direction indicated by the arrow.

Since the upper stack 44 of the airbag pack 16 is ejected first upon deployment and forms the part of the airbag that faces the windshield 24, the airbag unfolds and first fills up the triangle between the windshield and the dashboard. Subsequently, the lower stack 42 is pulled along, and then it expands in the direction toward the vehicle occupant, in FIGS. 2 and 3 toward the left, whereby the force of the expansion is advantageously restrained by the fact that the lower stack 42 is pulled along.

The arrangement of the gas generator 14 to the side of the airbag pack 16 advantageously results in a smaller installation depth of the airbag module 10. Moreover, the arrangement of the gas generator 14 in conjunction with the outlet channel 38 of the diffuser plate and with the funnel-shaped opening of the housing 12 determines the outlet direction in such a way that the airbag 16 is not ejected towards the windshield 24, as is the case with airbag modules with a gas generator underneath, but rather at an angle of approximately 20° to 70° with respect to the horizontal, that is to say, almost parallel to the windshield 24.

As can be clearly seen, the width of the outlet opening 26, which is small relative to the maximum width of the airbag pack, allows a smaller cover flap 20 than would be possible with an outlet opening that would extend across the entire width of the airbag pack. Therefore, the airbag module 10 can be installed close to the windshield 24. Another advantage of the installation site of the airbag module close to the windshield is that the cover flap is no longer located in the normal interaction area of a vehicle occupant.

The invention claimed is:

1. An airbag module for a vehicle occupant restraint system for location in a dashboard near a windshield of a vehicle, which extends at an acute angle to a horizontal,
   a) said airbag module having a lengthwise axis crosswise to the direction of vehicle travel,
   b) said airbag module comprising an elongated housing and an airbag which is folded up into an airbag pack,
   c) said airbag being arranged in said housing and adapted to be inflated by gas from a pressurized gas source,
   d) said housing having an outlet opening that defines an outlet plane,
   e) said outlet opening having a predetermined width measured parallel to said outlet plane in the direction of vehicle travel,
   f) said predetermined width being smaller than the largest width of said airbag pack measured parallel to said outlet plane in the direction of vehicle travel,
   g) said outlet opening at least partially facing said windshield,
   h) said pressurized gas source, as viewed in a cross section perpendicular to said lengthwise axis of said airbag module, being arranged in a more forward position with regard to the direction of vehicle travel than said airbag pack, and
   i) said housing having sidewalls forming an ejection channel, which surrounds the airbag and directs inflation of the airbag, including a first side wall projecting vertically higher and being located more forward with regard to the direction of vehicle travel than a second side wall opposite said first side wall, the outlet plane extending through the upper terminal ends of the first side wall and the second side wall, the outlet opening directing the initial inflation of said airbag at an angle of approximately 20° to 70° with respect to the horizontal, wherein said first wall slopes upwardly and rearwardly with respect to the direction of vehicle travel.

* * * * *